United States Patent [19]
Mishima

[11] Patent Number: 5,224,905
[45] Date of Patent: Jul. 6, 1993

[54] POWER TRANSMISSION BELT

[75] Inventor: Kyoichi Mishima, Kobe, Japan

[73] Assignee: Mitsuboshi Belting Ltd., Nagata, Japan

[21] Appl. No.: 773,672

[22] Filed: Oct. 7, 1991

[30] Foreign Application Priority Data

Oct. 9, 1990 [JP] Japan .................. 2-271970

[51] Int. Cl.$^5$ .............................................. F16G 3/10
[52] U.S. Cl. .................................. 474/258; 474/260; 474/271
[58] Field of Search .............. 474/258, 260, 264–266, 474/268, 271

[56] References Cited

U.S. PATENT DOCUMENTS

| 311,242 | 1/1885 | Gandy | 474/258 |
| 650,977 | 6/1900 | Mack | 474/266 |
| 1,335,280 | 3/1920 | Edwards | 474/266 |
| 2,039,258 | 4/1936 | Patterson | 474/271 |
| 2,717,427 | 9/1955 | Twomey | 474/271 X |
| 3,784,427 | 1/1974 | Griffin | 474/265 X |
| 3,981,206 | 9/1976 | Miranti et al. | 474/271 X |
| 4,767,389 | 8/1988 | Habegger et al. | 474/266 |

Primary Examiner—Ramon S. Britts
Assistant Examiner—Roger J. Schoeppel
Attorney, Agent, or Firm—Wood, Phillips, VanSanten, Hoffman & Ertel

[57] ABSTRACT

A power transmission belt with a belt body having a compression section, a load-carrying section, inside and outside surfaces, and laterally spaced pulley-engaging side surfaces. A fabric cover layer is provided on one of the inside, outside and laterally spaced pulley-engaging side surfaces. The fabric cover layer has an uninterrupted, substantially uniform thickness over the entire extent of the fabric layer on the one of the inside, outside and laterally spaced pulley-engaging side surfaces to which it attaches.

17 Claims, 2 Drawing Sheets

POWER TRANSMISSION BELT

BACKGROUND OF THE INVENTION

1. Field of the Invention

This invention relates to power transmission belts and, more particularly, to a power transmission belt having a belt body with a reinforcing fabric cover layer adhered to a surface thereof in such a manner that the thickness of the reinforcing fabric cover layer is substantially uniform over the entire extent of the surface to which it is adhered. The invention also contemplates a method of forming such a power transmission belt.

2. Background Art

It is known in the power transmission belt art to adhesively bond a fabric cover layer to the outer surface of the belt to effect reinforcement thereof. This fabric cover layer is commonly employed in V-ribbed belts. It is common in the prior art to preform an endless band of the fabric cover layer as one of the belt components which are sequentially built up on a cylindrical forming drum. Commonly, the ends of the fabric sheet are joined together to define the endless band of cover fabric which surrounds the forming drum.

Different manners of connecting the ends of the fabric cover layer have been utilized in the prior art. By one method, the ends of the cover fabric are overlapped in defining the endless band. This method of connection is desirable because of the ease with which it can be carried out. Generally, little care is exercised in precisely controlling the extent of overlap. The result of this overlap is a double thickness of the cover fabric which thus produces a step in the band on one surface thereof. The existence of the step is particularly a problem in inversion-type belt formation processes carried out on a forming drum. A brief description of such a conventional forming technique appears below to clarify this problem.

A conventional inversion-type belt formation process for a V-ribbed belt is disclosed in Japanese Patent Publication No. 52-17552. In this publication, a cylindrical forming drum is embraced by a cover fabric having its ends overlapped to produce a localized step resulting from a double thickness of the fabric cover layer. A first, relatively thin, rubber sheet is applied over the fabric cover layer. Load-carrying cords are wrapped around the first layer after which a second, thin, rubber layer and thick, compression rubber layer are sequentially laminated thereover. The resulting belt sleeve is then vulcanized after which V-shaped ribs are defined by grinding grooves in the compression rubber layer. The individual belts can then be separated out of the belt sleeve by known cutting techniques.

While the overlapping of the fabric cover layer ends facilitates formation of the endless fabric band, the production of the step, by reason of the double thickness of the fabric cover layer, can compromise the integrity of the belt formed by the above process. More particularly, the load-carrying cords, which are wrapped around the fabric cover layer, bend around the step in the fabric cover layer. Due to the local deformation of the load-carrying cords, the load-carrying cords effectively slacken as they bend around the step. The result is that when a force is applied to the belt in the region of the localized deformation, the belt tends to elongate in that region more readily than it would along the remainder of the belt. This may disrupt the otherwise smooth running of the belt and results in non-uniform power transmission capabilities along the length of the belt.

Further, as a result of the overlap of the ends of the fabric cover layer, the belt may have a non-uniform thickness, i.e. a bulge or localized thickening at the step, which might cause rough system operation.

Heretofore, it has been virtually impossible to eliminate this localized deformation of the load-carrying cords in the vicinity of the overlapped fabric cover layer, which is commonly overlapped on the order of 4-12 mm. Wrapping of the load-carrying cords too tightly to eliminate the bends therein might result in the load-carrying cords coming too close to or actually penetrating the fabric cover layer.

Another known method of fixing the relative positions of the ends of a fabric cover layer eliminates the deformation of the load-carrying cords, however introduces a further problem. By this method, there is no direct connection between the spaced ends of the fabric cover layer. Rather, the underlying rubber layer adheres to the ends of the fabric cover layer and thereby maintains them in a predetermined relative position. The result is that often there is a gap that remains between the butt edges of the fabric cover layer. The gap produces a point of weakening where the fabric cover layer provides no reinforcement to the belt. There is thus the potential for premature belt failure by reason of this interruption in the fabric cover layer.

SUMMARY OF THE INVENTION

The present invention is specifically directed to overcoming the above-enumerated problems in a novel and simple manner.

It is the principal objective of the present invention to provide a belt having a fabric cover layer that can be applied to the outside surface of the belt in an inversion-type belt forming process without resulting in deformation of the load-carrying cords that might alter the operating characteristics of the belt. Variation in load-carrying capability along the length of the belt, according to the present invention, is virtually eliminated. Further, a belt having uniform thickness along its length results.

More particularly, the invention is a power transmission belt with a belt body having a compression section, a load-carrying section, inside and outside surfaces, and laterally spaced pulley-engaging side surfaces. A fabric cover layer is provided on one of the inside, outside and laterally spaced pulley-engaging side surfaces. The fabric cover layer has an uninterrupted, substantially uniform thickness over the entire extent of the fabric layer on the one of the inside, outside and laterally spaced pulley-engaging side surfaces to which it attaches.

Accordingly, there is no step resulting from a double thickness of fabric cover layer that results from conventional overlapping connection of the ends of a fabric cover layer. The result is that the fabric cover layer does not alter the orientation of the other belt components so that the belt operates smoothly and exhibits consistent load-carrying capabilities over its entire longitudinal extent.

While the invention contemplates use with all types of power transmission belts, it is particularly desirable on V-ribbed belts, on the outside surface thereof.

In one form of the invention, the fabric cover layer is at least one of: a) woven fabric; b) tire cord fabric; and c) non-woven fabric that is at least one of cotton, nylon, and polyester.

The invention further contemplates a power transmission belt with a belt body having a compression section, a load-carrying section, inside and outside surfaces, and laterally spaced pulley-engaging side surfaces. A fabric cover layer is provided on one of the inside, outside, and laterally spaced pulley-engaging side surfaces. The fabric cover layer has a predetermined thickness and longitudinally spaced ends. Structure other than the belt body is provided for joining the spaced ends of the fabric cover layer together so that the spaced ends of the fabric cover layer do not overlap each other.

In one form of the invention, the spaced ends of the fabric cover layer each has a butt edge and the joining structure holds the butt edges together in abutting relationship.

According to the invention, the fabric cover layer has an inside surface and an outside surface and the joining structure is a heat-fusible material adhered to the ends of the fabric cover on at least one of the inside and outside surfaces of the fabric cover layer. Preferably, the heat-fusible material is a thermoplastic resin sheet or an unvulcanized rubber sheet having a thickness of between 0.2 and 0.5 mm.

Alternatively, according to the invention, the joining structure is a yarn that is stitched to the ends of the fabric cover layer, as through an overlocking machine.

The ends of the fabric cover layer are cut to define butt edges. The butt edges can be cut along a line that is perpendicular to the line of the longitudinal extent of the belt. Alternatively, the cuts are non-perpendicular to the line of the longitudinal extent of the belt and, in one form, are arranged so that the line thereof makes a 45° angle with the line of the longitudinal extent of the belt.

The invention also contemplates a method of forming a power transmission belt sleeve by sequentially placing belt components inside out on a forming drum. The method includes the steps of: providing an endless band of a fabric cover layer having a substantially uniform thickness over substantially its entire extent on a forming drum; placing an adhesive rubber layer over the fabric cover layer; wrapping load-carrying cords around the adhesive rubber layer; wrapping a compression rubber layer around the load-carrying cords; and vulcanizing the belt sleeve.

According to the invention, the fabric cover layer can be preformed so that it has spaced ends which are joined together in non-overlapping relationship to define the endless band fabric cover layer. Alternatively, the band can be formed in place on a forming drum.

The ends of the fabric cover layer can be joined by stitching a yarn thereto or by the use of a sheet-like material which fuses with the fabric cover layer during vulcanization. Thermoplastic resin and unvulcanized rubber will perform effectively in this manner.

To facilitate formation of the endless fabric cover layer band, the sheet-like material which connects the ends can be provided with a pressure sensitive adhesive and holds the spaced ends in a desired relationship to each other and to a forming drum prior to vulcanization.

After the belt sleeve is vulcanized, the inside surface of the belt sleeve, which is exposed outside of the drum, is cut to define ribs for the belts, which are then separated from the sleeve to define individual V-ribbed belts.

DETAILED DESCRIPTION OF THE DRAWINGS

Figure 1:
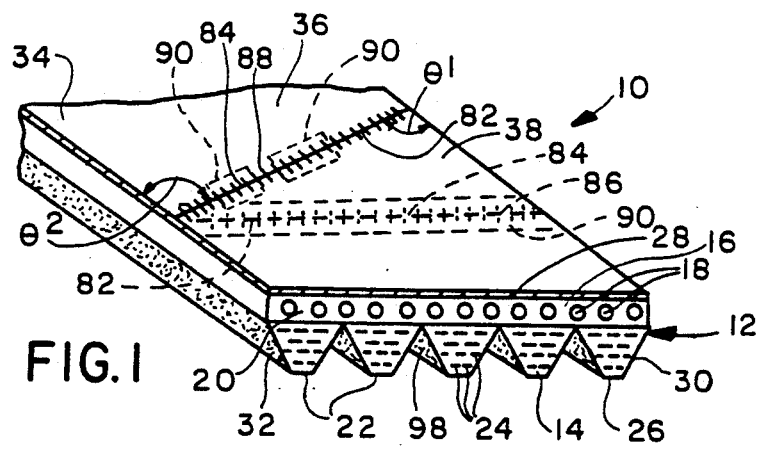
FIG. 1 is a perspective view of a cross-section of a V-ribbed belt with a fabric cover layer according to the present invention thereon.

In FIG. 1, a V-ribbed belt, according to the present invention, is shown at 10. While the present invention has utility with respect to other types of power transmission belts, it is particularly valuable in a V-ribbed belt, which is described herein for purposes of illustration.

It is common to form the ribs in the V-ribbed belt by either a grinding method or by a matrix method. The grinding method is described below, also only for purposes of illustration, and thus the invention should not be viewed as limited to this method of rib formation.

The belt 10 has a body 12 made up of a compression section 14, a tension section 16, and longitudinally extending load-carrying/tensile cords 18 defining the neutral axis for the belt 10.

The tensile cords 18 are made of high strength, low elongation material, such as polyester, aromatic polyamide, nylon, and the like, and are embedded in an adhesive rubber layer 20 between the tension and compression sections 16, 14, respectively.

The compression section 14 is made from rubber that is one, or a combination, of NR, SBR, CR, NBR, etc. The rubber in the compression section 14 is cut by techniques known to those skilled in the art i.e. by grinding, to define a plurality of longitudinally extending ribs 22.

A predetermined quantity of short, staple, reinforcing fibers 24 are embedded in the ribs 22 and extend laterally in substantially parallel relationship. The fibers 24 are made of one or a combination of, a) synthetic fibers made of nylon, vinylon, polyester, aromatic polyamide, etc. and b) natural fibers made of cotton, pulp, etc.

The belt body 12 has an inside surface 26, an outside surface 28 and spaced, laterally oppositely facing, side surfaces 30, 32. A fabric cover layer 34 is adhered to and covers the outside surface 28 of the belt body 12. The fabric cover layer 34 is made of one or a combination of: a) woven fabric; b) tire cord fabric; and c) non-woven fabric that is at least one of cotton, nylon, polyester, etc.

The present invention is directed principally to the joining of opposite ends 36, 38 on the fabric cover layer 34 to produce an endless band of the fabric cover layer 34. To understand the significance of the present invention, the formation of a prior art belt sleeve 42 through an inversion-type manufacturing process will be described below with respect to FIG. 6.

The belt sleeve 42 is defined on the outer surface 44 of a cylindrical forming drum 46. The belt sleeve components are built up sequentially on the forming drum 46 in an inside out fashion so that once the belt sleeve is completed, the individual belts must be severed and twisted about themselves to their useable state.

More particularly, a fabric cover layer 48 is wrapped closely around the drum outer surface 44. A thin, outer rubber layer 50 is placed over the fabric cover layer 48. Laterally spaced and longitudinally extending load-carrying cords 52 are then wrapped around the outer rubber layer 50 followed by a thin, inner rubber layer 54 and a thicker, compression rubber layer 56. These components are then vulcanized by conventional techniques after which a stone grinding wheel is used to cut grooves in the compression section 56 to thereby define a plurality of laterally spaced, longitudinally extending ribs 58 (one shown).

Figure 6:
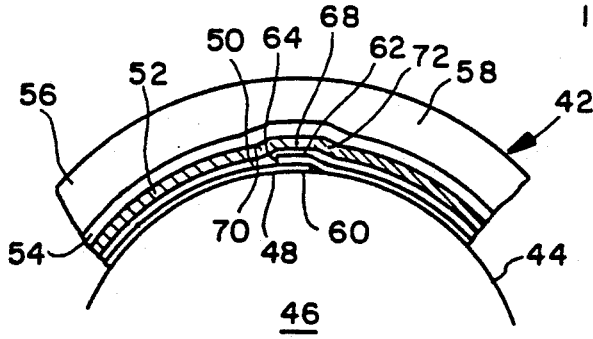
FIG. 6 is a side elevation view of a forming drum with a portion of a belt sleeve, made by conventional techniques, on the drum in inverted orientation.

The fabric cover layer 48 has ends 60, 62 that are joined to define an endless band for placement over the outer surface 44 of the forming drum 46. This end joining in the prior art belt sleeve 42 is accomplished by overlapping the ends 60, 62 as shown in FIG. 6. This overlap is on the order of 4-12 mm in circumferential distance. The result of having the double thickness of the fabric cover layer 48 at its ends 60, 62 is that a step 64 is defined. Because of the existence of the step 64, the superjacent rubber layer 50 and load-carrying cords 52 must be bent up and around the step resulting effectively in a localized bulge 68 in each of the load-carrying cords 52.

The result of this bulge 68 is that there is effectively a slackened portion 70, 72 in the load-carrying cords 52 at each end of the bulge. If a high load is applied to a belt cut from the sleeve 42, the slackened portions 70, 72 of the load-carrying cords 52 tend to be drawn taut, which allows more belt elongation at that portion of the belt than at that portion of the belt in which the load-carrying cords 52 are undeformed. The effect of this is that there is a momentary reduction in load-carrying capability as the slackened portions 70, 72 of the load-carrying cords 52 are drawn taut, as when driving or being driven by a pulley. This produces a slight momentary speed variation in the system which in turn causes undesired vibrations in the system.

Figure 2:
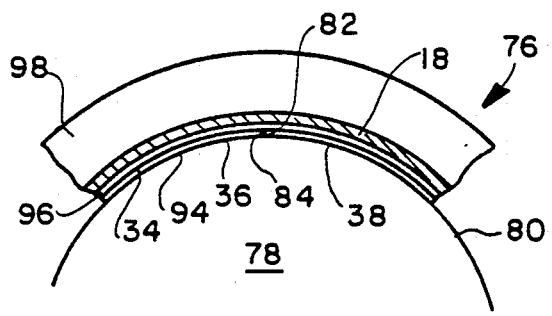
FIG. 2 is a side elevation view of a portion of a forming drum with a belt sleeve, according to the present invention thereon, in an inverted orientation.

The present invention obviates the above problem as will be explained with respect to the belt 10 in FIG. 1 and the belt sleeve 76, from which the belt 10 can be constructed and which is shown in inverted orientation on a forming drum 78 in FIG. 2.

To form the belt 10 in FIG. 1, the fabric cover layer 34 is wrapped continuously about the outer surface 80 of the forming drum 78. To define an endless band, the ends 36, 38 of the fabric cover layer are joined, each to the other, as seen in FIG. 1. More specifically, a butt edge 82 on the end 36 and a butt edge 84 on the end 38 are placed in abutting relationship, each to the other, and joined so that the ends 36, 38 reside in a single plane over the entire extent of the outside surface 28 of the belt body 12, as seen clearly in FIG. 2. This eliminates the step 64 shown in the prior art belt sleeve 42, previously described.

The ends 36, 38 are cut so that the lines of the butt edges 82, 84 thereon, respectively make angles $\Theta 1$, $\Theta 2$ with the line of the longitudinal extent of the belt 10. In a preferred form of the invention, $\Theta 1$ is equal to $\Theta 2$ and is equal to 45° so that the edges 82, 84 closely abut to prevent any interruption of the fabric cover layer 34. This cut angle produces what is known in the industry as a bias cut.

Alternatively, according to the invention and as shown in dotted lines in FIG. 1, the line of the seam 86 between the butt edges 82, 84 can be perpendicular to the line of the longitudinal extent of the belt 10. It should be understood that angles other than the perpendicular arrangement shown in phantom lines in FIG. 1 and the 45° cut shown in solid lines in FIG. 1 are also contemplated by the invention. Preferably, the angle 81, 82 are between 40° and 90°.

With the edges 82, 84 butted, the ends 36, 38 of the fabric cover layer 34 are joined preferably by one of two different techniques. The first technique involves connection through a stitched yarn 88 which is effected through an overlocking sawing machine using a cotton yarn, preferably 40 in number. This technique is commonly carried out with a commercially available machine sold by Pegasus Ltd.

By the second technique, a sheet-like fusible material 90 is applied to one or both of the inside and outside surfaces of the fabric cover layer 34. The sheet-like material 90 can be formed as discrete elements placed in laterally spaced locations over the seam 86 or can extend continuously along the entire lateral extent of the seam 86. The sheet-like material 90 is preferably a thermoplastic resin sheet having a thickness of between 0.2 and 0.5 mm. A pressure sensitive adhesive can be applied to initially hold the sheet-like material 90 in place on the drum 78 and on the belt sleeve 76 prior to vulcanization. During the vulcanization process, the sheet-like material 90 fluidizes under the conventional heat and pressure encountered during vulcanization and, resultingly, thermally fuses with the ends 36, 38 to unitize the fabric cover layer 34 into an endless band.

In a preferred method of forming the belt 10, according to the invention, the fabric cover layer 34 is chosen so that with the front edges 82, 84 in abutting relationship, the effective diameter of the outside surface 94 of the belt sleeve 76 is equal to the diameter of the outer surface 80 of the forming drum 78. In the event that the overlocking technique is employed, the ends 36, 38 of the fabric cover layer 34 are preferably joined before the cover layer 34 is placed on the drum 78.

In the event that the thermal bonding technique is employed, a plurality of pieces of sheet-like material 90 are preferably placed on the outer surface 80 of the molding drum 78 after which the ends 36, 38 of the cover layer 34 are adhered thereto. The fabric cover layer 34 is dip coated or has cement applied thereat to be held in place on the forming drum 78. Once the cover layer 34 is in place, an unvulcanized rubber sheet 96 is placed over the cover layer 34. The load-carrying cords 18 are wound around the rubber sheet 96 and underlying cover layer 34. A thick rubber layer 98 is wound over the load-carrying cords 18 to define the belt compression section 14. The belt components, assembled in FIG. 2 in a inverted arrangement, are vulcanized by heating and pressurizing, using conventional techniques.

Thereafter, a grinding mechanism is used to form V-shaped cuts/grooves 98 in the compression section 14. Typically a stone grinding wheel with a plurality of blades is used to define the cuts/grooves 98. From the belt sleeve 76, the individual belts are cut and then twisted from their inside out configuration to their useable state.

Test Setup

Figure 3:
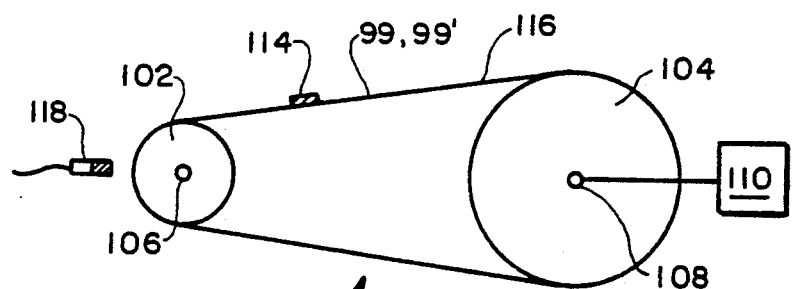
FIG. 3 is a schematic side elevation view of a test set-up including drive and driven pulleys for determining axial load variation during belt operation.

To demonstrate the effectiveness of the present invention, a sample inventive belt 99 (Test Sample No. 1) was compared to a conventional belt sample 99 (Test Sample No. 2) on a system as shown at 100 in FIG. 3. In the test set-up 100, the belts 99, 99' were trained about spaced drive and driven pulleys 102, 104, respectively. The pulleys 102, 104 were mounted for rotation about spaced, parallel axes, 106, 108. The drive pulley 102 had a diameter of 55 mm and the driven pulley a diameter of 120 mm. A load cell 110 was operatively connected to the driven pulley with the belts 99, 99' being run under a load of 10 kg per rib at 380 rpm. A reflecting plate 114 was adhered to the outer surface 116 of each belt sample 99, 99'. For the inventive belt 99, the reflecting plate 114 was mounted on the seam 86 in the fabric cover layer 34, whereas with the conventional belt 99', the reflecting plate 114 was mounted at the bulge 68, i.e. the point of overlapping of the ends 60, 62 of the fabric cover layer 48. A detector 118 for the reflecting plate 114 was provided adjacent to the drive pulley 102.

The axial load variation for the belts 99, 99' during belt operation was measured by the load cell 110. More particularly, the load cell 110 produced a voltage signal indicative of and proportional to the torque applied through the belts 99, 99' to the driven pulley 104. The plots of this voltage over a relevant 2 second interval are shown for the inventive belt 99 (Test Sample No. 1) in FIG. 5 and for the conventional belt 99, (Test Sample No. 2) in FIG. 8.

The detector 118 was used to plot the location of the seam 86 in the belt 99 and the step 64 in the belt 99,' where the ends 36, 38 of the fabric cover layer 34 were joined and the ends 60, 62 of the fabric cover layer 48 were joined, over the same time interval.

Figure 4:
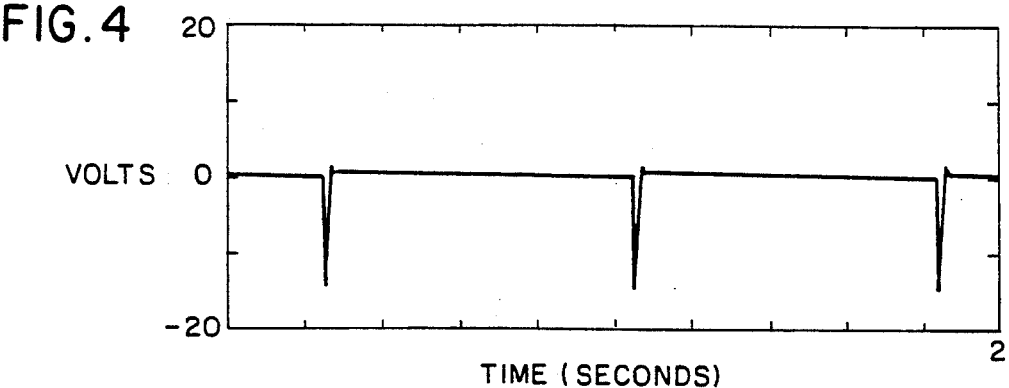
FIG. 4 is a graph for the inventive belt plotting voltage over a prescribed time period with the voltage signal being generated by a detector near the drive pulley to indicate the presence of a seam in the fabric cover layer at the drive pulley during operation of the inventive belt in the test setup of FIG. 3.
Figure 5:
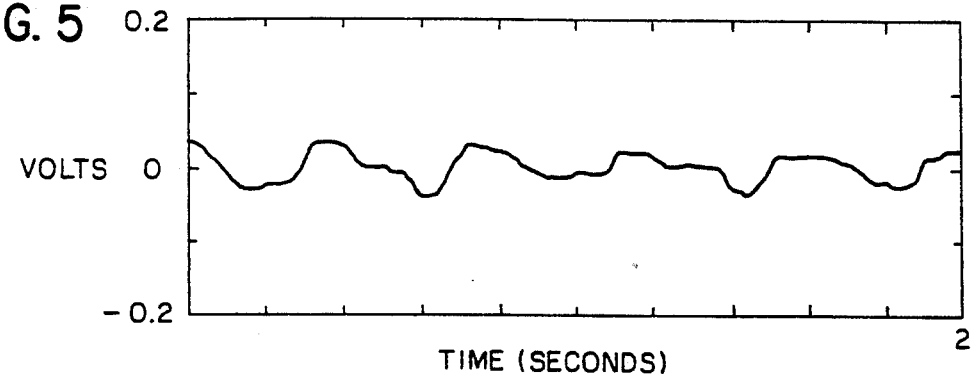
FIG. 5 is a graph for the inventive belt plotting voltage over the same time period as in FIG. 4, with the voltage signal generated by a load cell which senses the torque generated at the driven pulley during operation of the inventive belt in the test setup of FIG. 3.
Figure 7:
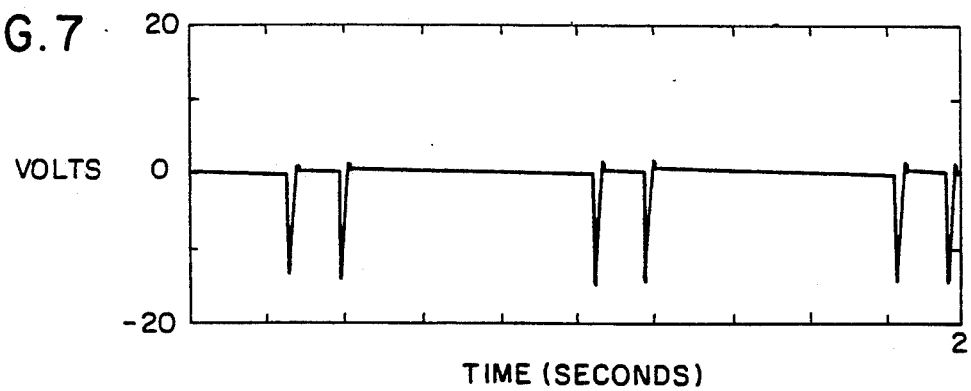
FIG. 7 is a graph as in FIG. 4 for a conventional V-ribbed belt tested on the FIG. 3 setup.
Figure 8:
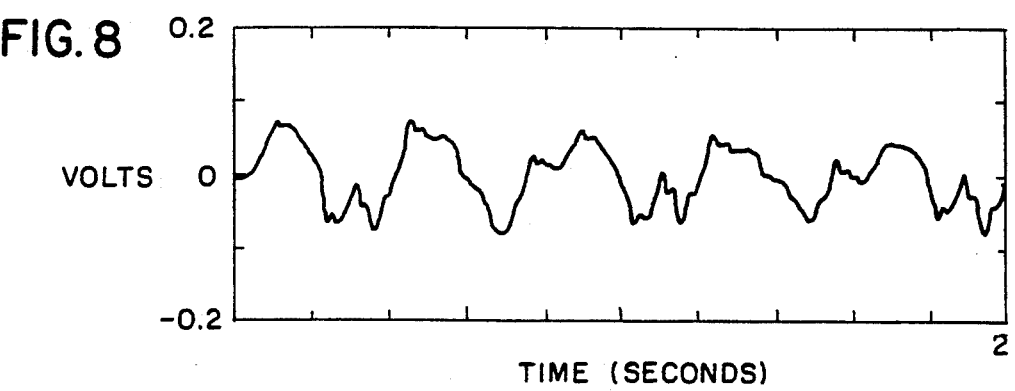
FIG. 8 is a graph as in FIG. 5 for the conventional belt generating the results of the graph of FIG. 7.

By measuring light reflection off of the belts 99, 99', the detector 118 produced a voltage signal which was abruptly altered upon the reflecting plate 114 being sensed by the detector 118. The plots of voltage over the time period corresponding to that in FIGS. 5 and 8 are shown in FIGS. 4 and 7, for the inventive belt 99 (Test Sample No. 1) and conventional belt 99' (Test Sample No. 2), respectively.

Test Sample No. 1 (Belt 99)

A V-ribbed belt 99 was used with a fabric cover layer 34 made up of rubber cemented cotton fabric. The load-carrying cords 18 were made of polyester and the adhesive layer 20 and compression section 14 were made of chloroprene rubber. An overlocking machine was used to join the fabric cover layer ends 36, 38 in non-overlapping relationship.

The voltage change measured by the load cell 110 at the driven pulley 104 as the belt portion with the seam 86 passed by the detector 118, i.e. as the belt part with the seam 86 therein drove the drive pulley 102, was relatively small. The axial load variation measured approximately 3.9 kg when converted from the voltage signal.

Test Sample No. 2 (Belt 99')

The same belt components were used for the V-ribbed belt 99' as for the inventive belt 99. However, the ends 60, 62 of the fabric cover layer 48 were lapped, one over the other, with a lap width of 8 mm.

The voltage change measured by the load cell 110 for Test Sample No. 2 as the step 64 passed by the detector 118 i.e. as the belt part with the step 64 drove the drive pulley 102, was considerably larger than that for Test Sample No. 1. The measured axial load variation was about 7.8 kg. In other words, the axial load variation was about twice as great with Test Sample No. 2 as it was with Test Sample No. 1.

Because the axial load variation with the inventive structure is small, speed alterations and system vibrations are minimized resulting in overall smoother system operation. The inventive belt also has a uniform thickness over its entire length, which contributes to its smooth operation. The result is that a system operating with the inventive belt is extremely efficient compared to one operated with conventional belts using overlapped fabric cover layer material.

The foregoing disclosure of specific embodiments is intended to be illustrative of the broad concepts comprehended by the invention.

I claim:

1. A power transmission belt comprising:
   a belt body having a tension section and a compression section, a load-carrying section, inside and outside surfaces, and laterally spaced pulley-engaging side surfaces,
   said belt body being defined at least partially by rubber,
   said belt body having a length and a uniform cross-sectional configuration along its entire length; and
   a fabric cover layer extending continuously around said belt body on at least one of said inside, outside, and laterally spaced pulley-engaging side surfaces and applied directly to a rubber layer over the entire longitudinal extent of the belt body,
   said rubber layer having a substantially uniform thickness over the entire longitudinal extent of the belt body.
   said rubber layer having a substantially uniform thickness over the entire longitudinal extent of the belt body fabric cover layer on the at least one of the inside, outside and laterally spaced pulley-engaging side surfaces,
   said fabric cover layer having longitudinally spaced end edges that are butted to each other.

2. The power transmission belt according to claim 1 wherein the load-carrying section has longitudinally extending load-carrying cords therein and the fabric cover layer is on the outside surface of the belt body.

3. The power transmission belt according to claim 1 wherein the power transmission belt is a V-ribbed belt and the fabric cover layer is on the outside surface of the belt body.

4. The power transmission belt according to claim 1 wherein the fabric cover layer is at least one of: a) woven fabric; b) tire cord fabric; and c) non-woven fabric that is at least one of cotton, nylon, and polyester.

5. The power transmission belt according to claim 1 wherein the fabric cover layer has an inside surface and an outside surface and there is a heat-fusible material adhered to the longitudinal ends of the fabric cover layer on at least one of the inside and outside surfaces of the fabric cover layer.

6. The power transmission belt according to claim 5 wherein the heat-fusible material is in the form of a flat sheet.

7. The power transmission belt according to claim 6 wherein the heat-fusible sheet material has a thickness of between 0.2 and 0.5 mm.

8. The power transmission belt according to claim 5 wherein the heat-fusible material is one of a thermoplastic resin sheet and an unvulcanized rubber sheet.

9. The power transmission belt according to claim 1 wherein a yarn is stitched to the longitudinal ends of the fabric cover layer.

10. The power transmission belt according to claim 1 wherein the power transmission belt has a longitudinal extent and the longitudinal end edges of the fabric cover layer are cut along a line that is perpendicular to the line of the longitudinal extent of the power transmission belt.

11. The power transmission belt according to claim 1 wherein the power transmission belt has a longitudinal extent and the longitudinal end edges of the fabric cover layer are cut along a line that is non-perpendicular to the line of the longitudinal extent of the power transmission belt.

12. The power transmission belt according to claim 11 wherein the line of the longitudinal end edges makes an angle of approximately 45° with the line of the longitudinal extent of the power transmission belt.

13. The power transmission belt according to claim 1 wherein there is a discrete, heat fusible material extending less than the entire length of the belt body and in contact with each said longitudinal end edge that is adhered to each said longitudinal end edge.

14. The power transmission belt according to claim 13 wherein the heat fusible material underlies each of the fabric cover ends and is adhered to the belt body.

15. The power transmission belt according to claim 14 wherein the heat fusible material does not extend continuously fully between the side surfaces of the belt body.

16. The power transmission belt according to claim 14 wherein the fabric cover ends are stitched to each other.

17. The power transmission belt according to claim 1 wherein there is one and only one thickness of the fabric cover layer on the one of the inside, outside, and laterally spaced pulley-engaging side surfaces.

* * * * *

UNITED STATES PATENT AND TRADEMARK OFFICE
CERTIFICATE OF CORRECTION

PATENT NO. : 5,224,905
DATED : July 6, 1993
INVENTOR(S) : Kyoichi Mishima

It is certified that error appears in the above-indentified patent and that said Letters Patent is hereby corrected as shown below:

Claim 1, column 8, line 46, change the period to a comma.

Claim 1, column 8, line 47, delete "rubber" and insert —fabric cover—.

Claim 1, column 8, line 48, delete "longitudinal"

Claim 1, column 8, line 49, delete "belt body".

Signed and Sealed this

Twenty-first Day of February, 1995

BRUCE LEHMAN

*Attest:*

*Attesting Officer*     *Commissioner of Patents and Trademarks*